(12) United States Patent
Saeed

(10) Patent No.: US 8,484,646 B1
(45) Date of Patent: Jul. 9, 2013

(54) SYSTEM AND METHOD FOR MANAGING PROCESS FLOWS WITHIN A COMPUTING DEVICE BASED ON USER BEHAVIOR

(75) Inventor: Umair Saeed, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1000 days.

(21) Appl. No.: 12/362,363

(22) Filed: Jan. 29, 2009

(51) Int. Cl.
*G06F 9/46* (2006.01)

(52) U.S. Cl.
USPC .............................. 718/102; 718/100; 718/105

(58) Field of Classification Search
None
See application file for complete search history.

(56) References Cited

U.S. PATENT DOCUMENTS

| | | | | |
|---|---|---|---|---|
| 7,233,929 | B1 * | 6/2007 | Lingle et al. .................. | 705/402 |
| 2002/0078035 | A1 * | 6/2002 | Frank et al. ....................... | 707/3 |
| 2003/0063136 | A1 * | 4/2003 | J'maev ........................... | 345/864 |
| 2004/0143623 | A1 * | 7/2004 | Fukui et al. .................... | 709/200 |
| 2004/0247748 | A1 * | 12/2004 | Bronkema ..................... | 426/106 |
| 2005/0240857 | A1 * | 10/2005 | Benedict et al. ............... | 715/500 |
| 2007/0130145 | A1 * | 6/2007 | Pedersen et al. .................. | 707/9 |
| 2008/0126815 | A1 * | 5/2008 | Cantwell et al. ............... | 713/323 |
| 2008/0147847 | A1 * | 6/2008 | Pitkow et al. .................. | 709/224 |
| 2009/0138592 | A1 * | 5/2009 | Overcash et al. .............. | 709/224 |
| 2011/0060573 | A1 * | 3/2011 | Cullick et al. .................. | 703/10 |

* cited by examiner

*Primary Examiner* — Scott Sun
(74) *Attorney, Agent, or Firm* — Park, Vaughan, Fleming & Dowler, LLP

(57) ABSTRACT

Some embodiments of the present invention provide a system that manages process flows based on user behavior. During operation, at least one available user input selection in a first process flow is designated as being associated with an optional process flow segment. Next, at least one input that has been designated as an available user input selection is received from a user, and information associated with that input is stored in a data set. The data set is then analyzed to determine whether local criteria associated with the optional process flow segment has been satisfied. If so, the optional process flow segment is scheduled to be performed.

13 Claims, 3 Drawing Sheets

SYSTEM AND METHOD FOR MANAGING PROCESS FLOWS WITHIN A COMPUTING DEVICE BASED ON USER BEHAVIOR

BACKGROUND

Related Art

This disclosure is generally related to techniques for modifying a process flow within a computing device based on user behavior.

In a typical computing device, program instructions executed by a processor perform various tasks, such as providing information to a user, receiving input from a user, operating on the input, displaying information on a display, and storing and retrieving information.

Such tasks may be grouped together in a desired order as portions of a process flow, wherein such groups will be referred to herein as "process flow segments". Such process flow segments are typically predetermined, and are often user-selectable. Moreover, the particular process flows a given computing device supports are often important to the satisfaction a user may have with the particular computing device.

SUMMARY

Some embodiments of the present invention provide a system that manages process flows based on user behavior. During operation, at least one available user input selection in a first process flow is designated as being associated with an optional process flow segment. Next, at least one input that has been designated as an available user input selection is received from a user, and information associated with that input is stored in a data set. The data set is then analyzed to determine whether local criteria associated with the optional process flow segment has been satisfied. If so, the optional process flow segment is scheduled to be performed.

In some embodiments, the content of the stored information associated with the received input includes one or more of, the date the input occurred, information reflecting which particular user was associated with the input, and an event identifier associated with received input.

In some embodiments, scheduling the optional process flow segment to be performed causes the optional process flow segment to be performed within the first process flow.

In some embodiments, the data set includes data from a present user session of the user and data from at least one previous user session of the user.

In some embodiments, global and local criteria both need to be satisfied for an optional process flow segment to be scheduled.

In some embodiments, an input manager is configured to receive the inputs and a process flow manager coupled to the input manager is configured to store the data associated with the received inputs in a data set. The process flow manager is also configured to analyze the data set against criteria associated with an optional process flow display, and to display the optional process flow display to the user if the optional process flow display criteria has been satisfied.

BRIEF DESCRIPTION OF THE FIGURES

In the figures, like reference numerals refer to the same figure elements.

DETAILED DESCRIPTION

Figure 1:
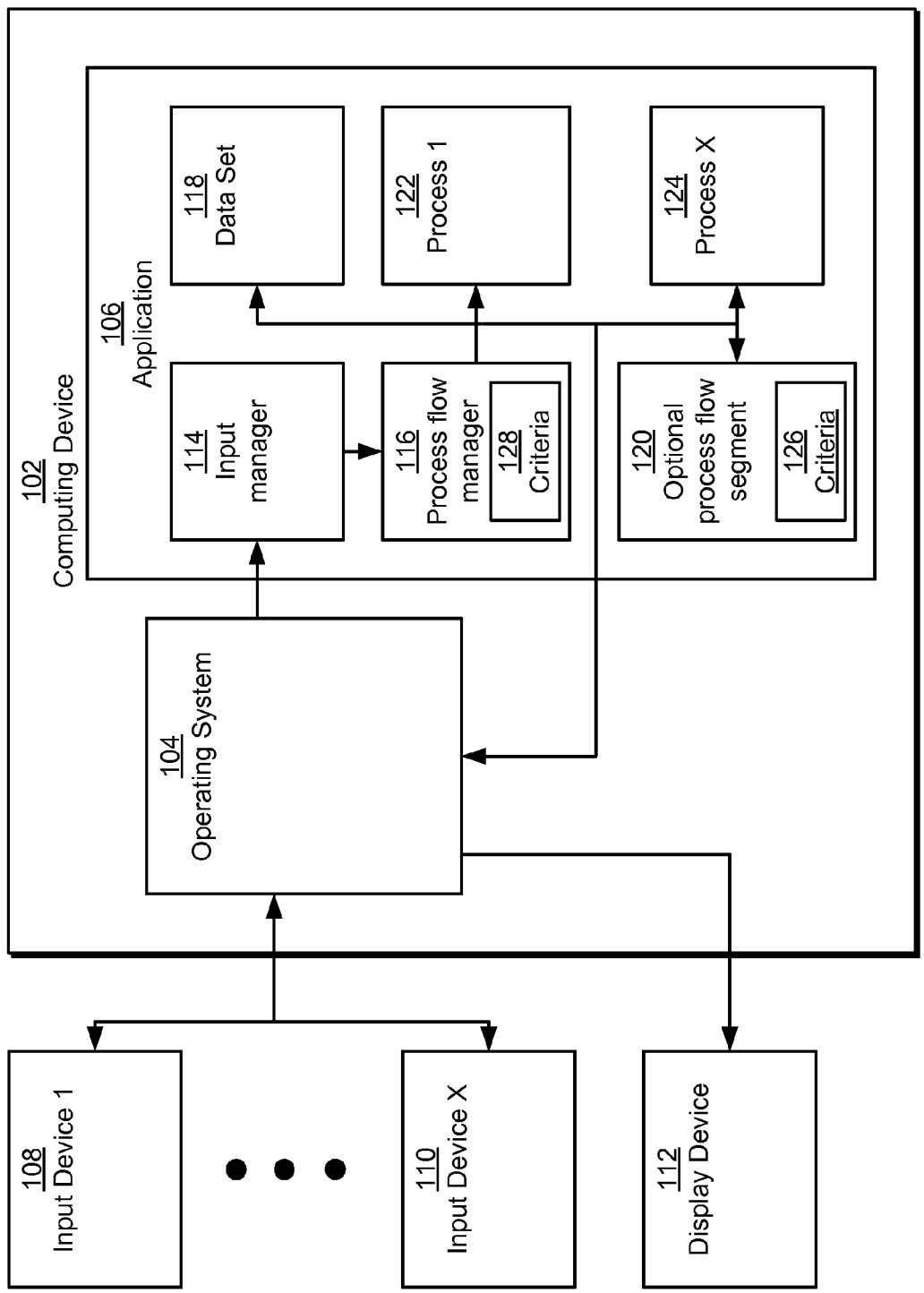
FIG. 1 shows a computing device in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

In computing devices and systems, process flows can greatly influence the experience a user may have when operating the device. Those process flows may be integrated into the general operating system, employed to perform application-specific tasks such as receiving and operating on inputs from a user, storing and displaying data, etc. The quality of the user experience is important, because a user is more likely to use the device and associated process flows more frequently if the user's experience has been favorable.

Though users of certain types of process flows and computing devices may share some characteristics such as a general favorable interest in the type of device, the characteristics of various processes performed by the computing device, etc., users can vary widely depending upon how they use devices and processes. The more the various process flows of a device are tailored to a particular user of the device, the more favorable the user's experiences are likely to be. Furthermore, information which is collected about the behavior of a present user may be compared with similar information from other users of similar devices and processes to identify other possible process flows that may be of interest to the present user.

One embodiment of the present invention is directed at modifying process flows in a computing device based on user behavior. In this embodiment, as a user uses a computing device, information is collected about such things as the various choices the user makes, the inputs the user enters, the screens the user accesses, etc., and the system determines whether or not optional process flow segments are performed based on whether the collected information satisfies criteria associated with the optional process flow segments.

This system operates on a computing device which may be, for example, a personal computer (PC), a mobile phone, a personal digital assistant (PDA), or any other device supporting one or more process flows which interact with a user either directly or indirectly over a network.

FIG. 1 shows a computing device in accordance with an embodiment of the present invention. As shown in FIG. 1, computing device 102 includes operating system 104 and application 106, and is coupled to one or more input devices such as input device 1 108, and input device X 110. In an embodiment of the present invention, computing device 102 is also coupled to display device 112 for displaying information to a user of computing device 102.

In one or more embodiments, application 106 includes input manager 114 which is coupled to one or more input devices such as input device 1 108 and input device X 110, through operating system 104. Input from a user may be obtained through any such input device. Common input devices suitable for practicing the present invention include such things as a keyboard, a mouse, a stylus, microphones, light pens, a touch screen, joysticks, and any other device suitable for receiving input from a user of the computing device.

Process flow manager 116 is coupled to input manager 114, and also to data set 118, optional process flow segment 120, and various process flows such as process 1 122, and process X 124. Inputs are received from a user of computing device 102 while a process (such as process 1 122) is being performed. In addition to process flow manager 116 collecting and storing information about the input selections being made by the user, process flow manager 116 executes process 1 122 normally, to provide a user experience and to complete tasks associated with application 106.

Optional process flow segment 120 makes use of criteria 126 against which information from data set 118 will be analyzed and matched in order to determine whether to schedule the performance of optional process flow segment 120.

Input manager 114 and process flow manager 116 are depicted herein as being associated with application 106. However, other configurations are contemplated, such as one or more of input manager 114 and process flow manager 116 being integrated into operating system 104.

Although only optional process flow segment 120 has been depicted herein, persons of ordinary skill in the art having the benefit of this disclosure will appreciate that there may be more than one optional process flow segment available to schedule, each with its associated criteria to satisfy prior to being scheduled.

Persons of ordinary skill in the art familiar with this disclosure will appreciate that there are many known techniques for scheduling process flows to be performed in a computer. In one or more embodiments, scheduling an optional process flow segment, such as optional process flow segment 120, causes optional process flow segment 120 to be performed contemporaneously with another process flow, such as process 1 122, which was being performed at the time it was determined that criteria 126 was satisfied.

In one or more embodiments, the satisfaction of criteria 126 and the determination that criteria 126 is satisfied may take place during different time periods. In one or more embodiments, the determination about the satisfaction of criteria 126 and the scheduling of optional process flow segment 120 are performed at different times. In one or more embodiments, scheduling optional process flow segment 120 to be performed causes optional process flow segment 120 to be performed within the first process flow.

Input manager 114 may be configured to receive all inputs provided by the user to computing device 102, but some of the received inputs may not be relevant to any optional process flow segment available to be performed, and thus may not be used by other components of the invention. In one or more embodiments, only inputs that are related to criteria associated with an optional process flow segment are operated on by input manager 114 and process flow manager 116. In this embodiment, the remainder of the inputs received from the user by computing device 102 are operated on normally by computing device 102, but are ignored by input manager 114 and process flow manager 116.

When a relevant input is received from a user of computing device 102 at input manager 114, information about that received input is passed by input manager 114 to process flow manager 116, which saves that information in data set 118. In one or more embodiments, data set 118 contains the information about the most recently received input, as well as information about other relevant inputs previously received from the user of computing device 102.

The content of data set 118 may include such data as: the date the input occurred, information reflecting which particular user was associated with the input, one or more event identifiers associated with the received input, indication that the user accessed a particular screen, an increment to the number of times the user has used a particular application such as application 106, or any other data deemed relevant to the determination of whether to schedule an optional process flow segment to be performed. An event identifier may indicate any useful information related to the input, such as an option the user selected, the character of the input, the screen being accessed at the time the input occurred, or any other information related to the input.

At an appropriate time when data set 118 includes information to analyze, process flow manager 116 analyzes data set 118 to determine whether criteria 126 has been satisfied. If so, optional process flow segment 120 is scheduled to be performed. Criteria 126 may be any criteria deemed useful and relevant to optional process flow segment 120. For example, if optional process flow segment 120 is designed to display a particular set of information to the user, and that set of information is related to a particular screen where certain inputs may be provided by the user, the criteria may include one or more such things as a minimum number of times the user accessed that particular screen, a minimum number of times the user used this particular application 106, and any other criteria deemed relevant.

Criteria 126 may be simple or complex, depending on the design of application 106, and the design of optional process flow segment 120. In one or more embodiments, criteria 126 has a single aspect that must be satisfied prior to optional process flow segment 120 being scheduled. For example, in this embodiment, criteria 126 may specify that a particular process flow of application 106 must have been accessed more than a predetermined number of times. In this example, optional process flow segment 120 is scheduled after that particular process flow of application 106 had been accessed the predetermined number of times.

In one or more embodiments, criteria 126 has more than one aspect that must be satisfied prior to optional process flow segment 120 being scheduled. For example, a first aspect of criteria 126 may include that a particular process flow of application 106 must have been accessed more than a predetermined number of times, and a second aspect may include that the user has selected a particular input at least half of the number of times the particular process flow had been accessed. In this example, the optional process flow segment 120 will be scheduled only if both aspects of criteria 126 have been satisfied.

In one or more embodiments, process flow manager 116 includes global criteria 128 which must be satisfied prior to any optional process flow segment being scheduled. For example, designers of application 106 may desire that no optional process flow segment, such as optional process flow segment 120, be performed until application 106 has been accessed a particular number of times, regardless of whether criteria 126 has been satisfied.

Persons of ordinary skill in the art familiar with this disclosure will appreciate that the invention may be performed in various configurations. In the discussion of FIG. 1, the invention was performed within a single computing device. However, it is common for users of computing devices to interact with process flows on other computing devices over networks. For example, a first computing device may manage and control the display of information to a user, and a second computing device which is coupled to the first computing device through a network, may control the execution of process flows. Other configurations are also possible while remaining within the scope and spirit of the present invention.

Figure 2:
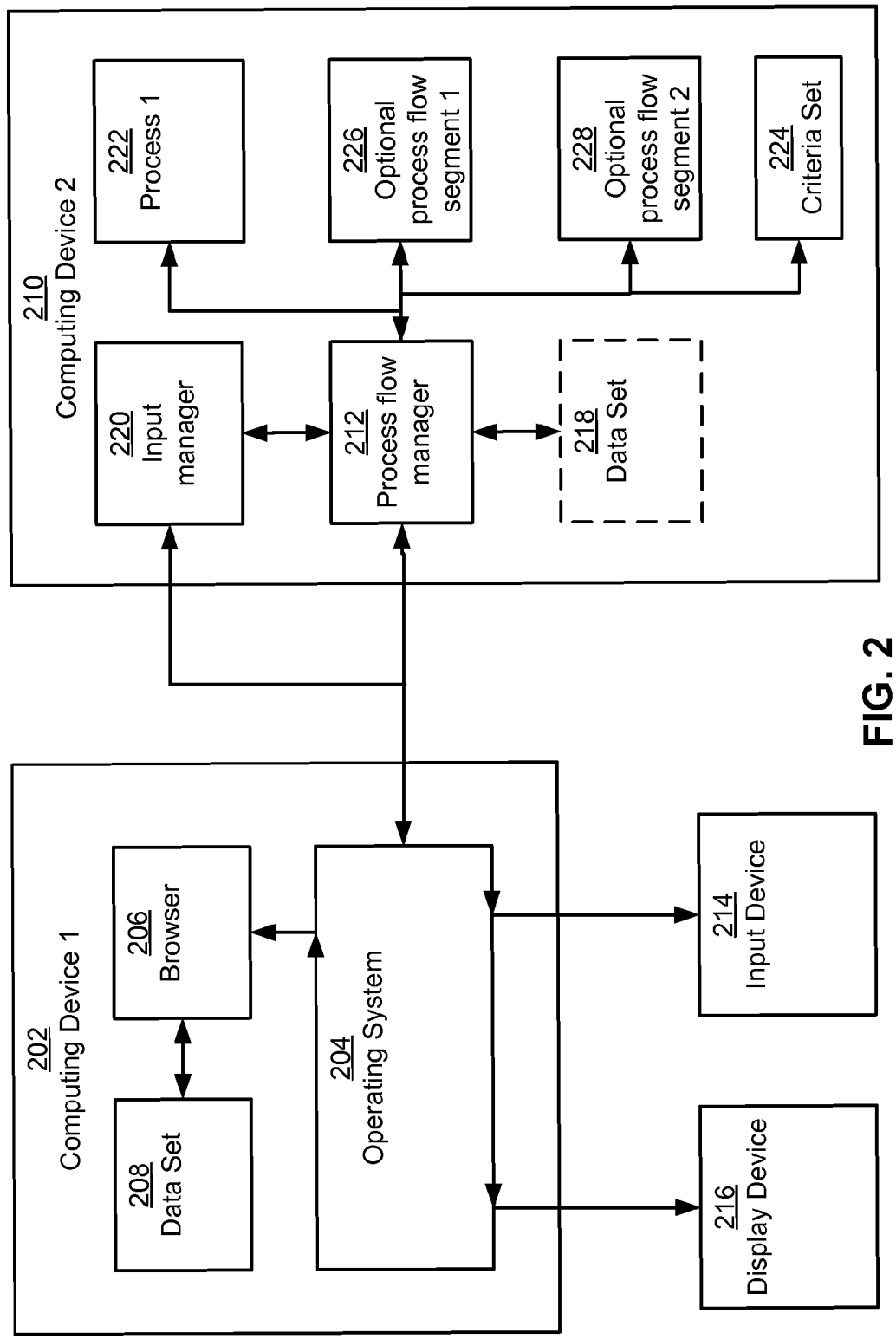
FIG. 2 shows a computing network in accordance with an embodiment of the present invention.

FIG. 2 shows a computing network in accordance with an embodiment of the present invention. Referring to FIG. 2, computing device 1 202 includes operating system 204, browser 206, and data set 208. Browser 206 is typically an application which provides an interface and platform for user interaction with remote computing environments, such as computing device 2 210. Browser 206 may also include mechanisms to execute program snippets such as applets to accomplish such things as the management and control of data set 208, if needed.

Computing device 1 202 and computing device 2 210 may be coupled together through one or more mechanisms and/or networks known to persons of ordinary skill in the art. Such networks may include, but are not limited to, local area networks, wide area networks, wireless networks, or any other type of mechanism or network suitable for coupling two or more computing systems together. In one or more embodiments, computing device 2 210 operates as a server, and is coupled to multiple other computing devices associated with other users interacting with computing device 2 210 through a browser or other application.

Data set 208 includes information collected about user activity occurring over one or more user sessions for any given user, and may be managed by process flow manager 212 of computing device 2 210, through operating system 204, and browser 206. Information may be displayed for a user of computing device 1 202 by browser 206 through display device 216. In one or more embodiments, process flow manager 212 is configured to store information about relevant user inputs in data set 208.

In some situations, it may be advantageous to store the user activity data on computing device 2 210, rather than storing it in data set 208 on computing device 1 202. In one or more embodiments process flow manager 212 is configured to interact with and store information about relevant user inputs in data set 218. Furthermore, in one or more embodiments, data set 218 contains aggregated information about relevant user inputs associated with more than one user. Also, in one or more embodiments, data set 218 contains information about user interaction with optional process flows that have been executed for those users. This information about the user interaction may contain such details as the amount of time particular users spent within the optional process flow, and other information indicating the degree of satisfaction a user may have with the optional process flow segment.

By comparing the present users' data with the data of other users who have experienced one or more optional process flow segments, a decision can be made to schedule one or more of those optional process flow segments, based on the levels of satisfaction those other users had while interacting with the one or more optional process flow segments.

As with computing device 102 of FIG. 1, input manager 220 in FIG. 2 may be configured to receive all inputs provided by the user to computing device 2 210. However, some of the received inputs may not be relevant to computing device 1 202, and may also not be relevant to any optional process flow segment available to be performed. In one or more embodiments, those irrelevant inputs will not be used by other components of the invention. Hence, in these embodiments, only inputs that are related to criteria associated with an optional process flow segment are operated on by input manager 220 and process flow manager 212. In these embodiments, the remainder of the inputs received from the user by computing device 1 202 are operated on normally by computing device 2 210, but are not acted upon by input manager 220 and process flow manager 212.

In some embodiments, the inputs being received from the user are in response to actions made available by process 1 222 through browser 206, and display device 216. As with the single computing device configuration, process flow manager 212 analyzes data set 218 to determine whether data collected for the user of computing device 1 202 satisfies criteria set forth in criteria set 224. In one or more embodiments, criteria set 224 contains criteria for one optional process flow segment, such as optional process flow segment 1 226. In one or more embodiments, criteria set 224 contains criteria for more than one optional process flow segment, such as optional process flow segment 1 226, and optional process flow segment 2 228.

At an appropriate time, when data set 218 has information to analyze, process flow manager 212 analyzes data set 218 to determine whether any complete set of criteria in criteria set 224 relating to any optional process flow segment, such as optional process flow segment 1 226, has been satisfied. If so, the corresponding optional process flow segment associated with the satisfied criteria is scheduled to be performed. As before, criteria set 224 may include any criteria deemed useful and relevant to an optional process flow segment. For example, if an optional process flow segment such as optional process flow segment 1 226 is designed to display a particular set of information to the user, and that information is related to a particular screen where certain inputs may be provided by the user, the criteria may include such things as a minimum number of times the user has accessed that screen, a minimum number of times the user has used this particular application 106, or any other criteria deemed relevant.

Figure 3:
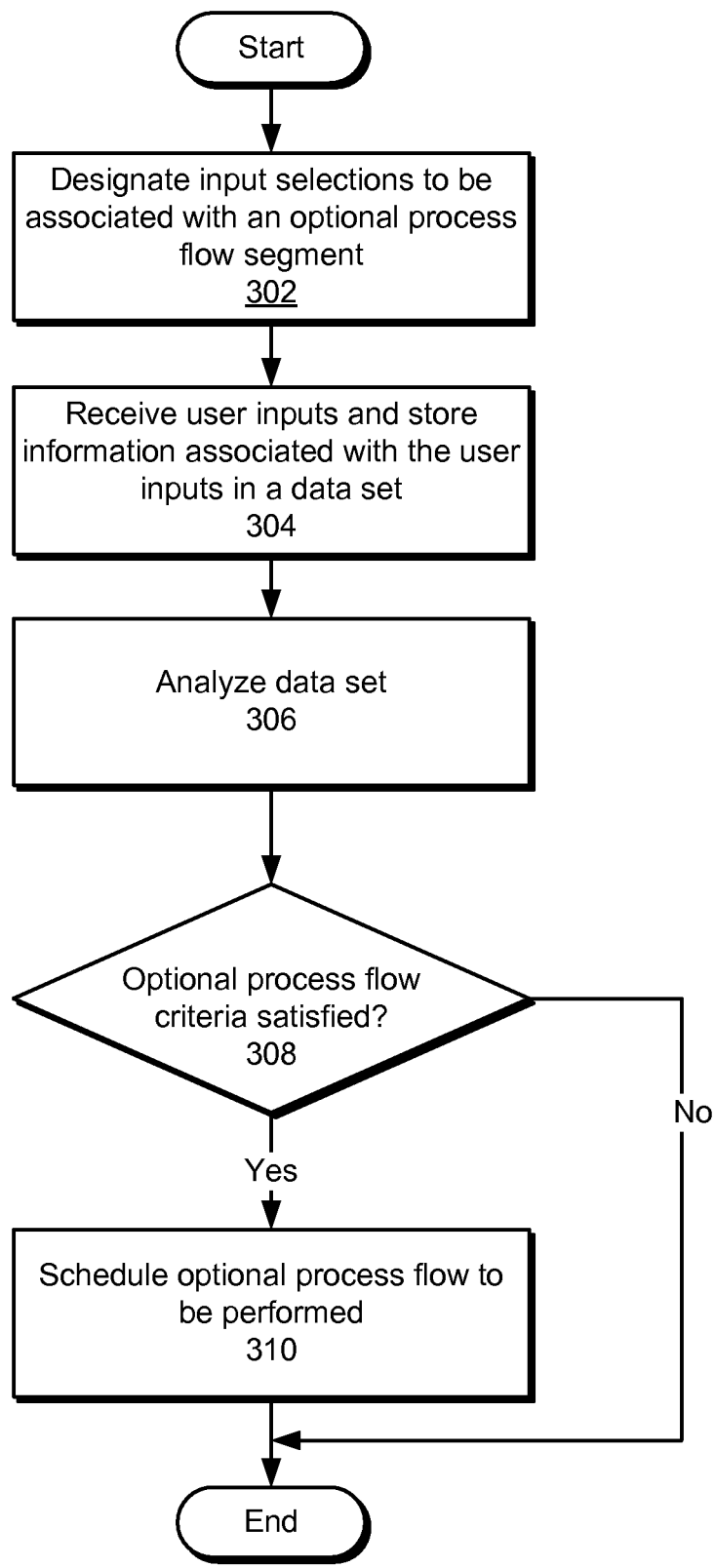
FIG. 3 shows a flowchart illustrating a method for managing process flows based on user behavior in accordance with an embodiment of the present invention.

FIG. 3 shows a flowchart illustrating a method for managing process flows based on user behavior in accordance with an embodiment of the present invention. The process begins at 302 when input selections relevant to a given optional process flow segment are designated. These designations can be accomplished merely by causing data collection to take place, to collect information about which input selections are being made by a given user of the system. It is information related to these input selections which is stored in a data set, such as data set 218 of FIG. 2.

At 304, inputs are received and information about those inputs is stored in a data set for later analysis. Recall that inputs are selections the user has made corresponding to a process flow the user is interacting with on a computing device they are using, such as computing device 1 202 of FIG. 2. It is intended that the receiving of inputs be treated generally. For example, an input may be received at input manager 220 of FIG. 1 when input manager 220 recognizes that a user input selection has been made.

The information stored in the data set, such as data set 218 of FIG. 2, may include anything relevant to determining whether criteria associated with a given optional process flow segment has been satisfied. For example, such information may specify that the user has accessed a particular screen, that the user has accessed a particular process flow, that the user has selected a particular choice from among more than one choice within the process flow, the number of times the user has used this particular application 106, or any other information relevant to determining whether a given criteria set has been satisfied.

At 306, the information contained within the data set is analyzed to determine whether criteria for any optional process flow segment has been satisfied. Such analysis may include direct comparison of numerical values, computation of ratios, determination of access frequency over a given time period, or any other analysis deemed relevant to determining whether criteria associated with an optional process flow segment has been satisfied.

At 308, it is determined whether criteria associated with an optional process flow segment has been satisfied. For example, in FIG. 1, process flow manager 116 analyzes the data against criteria 126, and makes a determination as to whether criteria 126 associated with optional process flow segment 120 is satisfied. If so, at 310, the optional process segment associated with the satisfied criteria is scheduled.

If, at 308, none of the criteria sets associated with any available optional process flow segments has been satisfied, the method ends.

Optionally, when an optional process flow segment, such as optional process flow segment 120 of FIG. 1, has been scheduled, or following the determination that no criteria set associated with any optional process flow segment has been satisfied, the method may proceed again at 304, to continue collecting information relating to relevant inputs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for scheduling a process flow segment to be performed within a computer system based on user behavior, comprising:
    designating at least one available user input selection in the first process flow as being associated with the process flow segment, the first process flow comprising a plurality of process flow tasks;
    receiving input from a user selecting at least one of the designated available user input selections, and storing first information associated with that received input in a data set;
    analyzing the data set to determine whether local criteria associated with the process flow segment has been satisfied; and
    if the local criteria associated with the process flow segment has been satisfied, scheduling the process flow segment to be performed, wherein the process flow segment is scheduled to be performed contemporaneously with process flow tasks from the first process flow.

2. The computer-implemented method of claim 1, wherein the content of the stored first information associated with the received input includes at least one selected from the group including, the date the input occurred, the particular user associated with the input, and an event identifier associated with the selected one of the at least one of the designated available user input selections.

3. The computer-implemented method of claim 1, wherein the scheduling of the process flow segment to be performed causes the process flow segment to be performed within the first process flow.

4. The computer-implemented method of claim 1, wherein the scheduling of the process flow segment to be performed causes the process flow segment to be performed contemporaneously with a second process flow.

5. The computer-implemented method of claim 1, wherein the process flow segment includes a plurality of process flow events.

6. The computer-implemented method of claim 1, wherein the content of the stored first information is at least partly derived from the criteria associated with the process flow segment.

7. The computer-implemented method of claim 1, wherein the process flow segment includes at least one process flow event which causes second information to be displayed on a display device.

8. The computer-implemented method of claim 1, wherein the data set includes data from a present user session of the user and data from at least one previous user session of the user.

9. The computer-implemented method of claim 1, further including
    analyzing the data set to determine whether global criteria has been satisfied; and
    wherein the scheduling of the process flow segment to be performed occurs only if the global criteria and the local criteria have both been satisfied.

10. The computer-implemented method of claim 1, wherein the criteria associated with the process flow segment has a plurality of aspects that must be satisfied in order for scheduling to occur.

11. The computer-implemented method of claim 1, wherein the criteria associated with the process flow segment, and the process flow segment composition are both predetermined and static.

12. The computer-implemented method of claim 1, wherein at least one of the criteria associated with the process flow segment and the process flow segment composition is determined at least partly by comparing at least a portion of the data set with aggregated information.

13. A non-transitory computer-readable storage medium storing instructions that when executed by a computing device cause the computing device to perform a method for scheduling a process flow segment to be performed within the computing device based on user behavior, the method comprising:

designating at least one available user input selection in the first process flow as being associated with the process flow segment, the first process flow comprising a plurality of process flow tasks;

receiving input from a user selecting at least one of the designated available user input selections, and storing first information associated with that received input in a data set;

analyzing the data set to determine whether local criteria associated with the process flow segment has been satisfied; and scheduling, if the local criteria associated with the process flow segment has been satisfied, the process flow segment to be performed, wherein the process flow segment is scheduled to be performed contemporaneously with process flow tasks from the first process flow.

* * * * *